United States Patent
Ben-Ephraim et al.

(12)

(10) Patent No.: US 6,202,144 B1
(45) Date of Patent: Mar. 13, 2001

(54) COMPUTER SYSTEM HAVING A SINGLE POINTER BRANCH INSTRUCTION AND METHOD

(75) Inventors: Arie Ben-Ephraim, Herzlia; Avi Ginsberg, Even Yehuda; Alex Miretsky, Haifa; Vitaly Sukonik, Hadera; Arie Kazachin, Rishon Lezion, all of (IL)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/273,369

(22) Filed: Mar. 22, 1999

(30) Foreign Application Priority Data

Mar. 27, 1998 (EP) ................................. 98105600

(51) Int. Cl.$^7$ ..................................................... G06F 12/00
(52) U.S. Cl. ........................................... 712/238; 712/226
(58) Field of Search ..................................... 712/226, 238

(56) References Cited

U.S. PATENT DOCUMENTS

| | | | |
|---|---|---|---|
| 4,905,141 | * 2/1990 | Brenza | 711/129 |
| 5,632,024 | 5/1997 | Yajima et al. | 395/381 |
| 5,784,605 | * 7/1998 | Ando | 712/238 |
| 6,021,272 | * 2/2000 | Cahill | 717/5 |
| 6,044,450 | * 3/2000 | Tsushima | 712/24 |
| 6,108,773 | * 8/2000 | Col | 712/237 |
| 6,119,222 | * 9/2000 | Shiell | 712/238 |

OTHER PUBLICATIONS

Breternitz M J R et al, "Enhanced compression techniques to simplify program decompression and execution", Proceedings. International conference on computer design VLSI in computers and processors, Austin, Texas, USA, Oct. 12–15, 1997, IEEE, pp. 170–176.

Wolfe et al, "Executing compressed programs on an embedded RISC architecture", 25$^{th}$ annual international symposium on microarchitecture. Micro 25, portland, or,USA, Dec. 1–4, 1992, vol. 23, No. 1–2, pp. 81–91.

* cited by examiner

Primary Examiner—Eric Coleman

(57) ABSTRACT

A computer system and method are described having a single pointer for a branch target instruction and multiple pointers and instruction parts for non-branch target instructions. All instructions, except branch target instructions are divided and stored in different location within a memory. A tag is used to identify a variable boundary between first and second halves of the memory space, word by word. The first half of the memory space contains V of H parts of the instructions and the second half of the memory space contains the H-V parts. The parts in the first and second halves of the memory space can be compressed and decompressed in parallel.

10 Claims, 4 Drawing Sheets

COMPUTER SYSTEM HAVING A SINGLE POINTER BRANCH INSTRUCTION AND METHOD

RELATED INVENTION

A commonly assigned patent application Ser. No. 09/273,386, entitled "Computer System Having a Multi-Pointer Branch Instruction and Method", by Rami NATAN et al., filed conurrently herewith is related.

FIELD OF THE INVENTION

The invention concerns a computer using a single pointer branch instruction and operating and memory organization method therefore.

BACKGROUND OF THE INVENTION

Computer instructions are generally stored in a memory coupled to the central processor (CPU) of a computer system. Some instructions involve branching. Branching can be conditional or unconditional.

A branch target instruction is the instruction that is fetched by the processor (CPU) when executing a branch instruction. Usually, during the execution of a branch instruction, the CPU outputs the address of the branch target instruction to instruction memory. This address is known as the "branch target address" and is a part of any branch instruction. The size of each instruction can vary for various reasons, including using compression coding. Pointers are employed to point to the locations in memory where various parts of instructions are stored. It is often the case that parts of an instruction are stored at different locations in memory necessitating the use of pointers to locate the various parts.

When there is a need to branch to a branch target instruction, there is a need to know all the pointers of the branch target instruction. Storing all the pointers of the branch target instruction within a branch instruction can cause several problems. For example, it can make the branch instruction very long, and require more than one read cycle in order to read and process it. Also, a long branch instruction allows very few bits for pointers, so that there is very limited branching space.

Thus, there is an ongoing need for improved computers and computer memory organization and operating methods which reduce or eliminate these and other well known limitations of the prior art in employing or implementing branching instructions.

DETAILED DESCRIPTION OF THE DRAWINGS

An advantage of the present invention is that it provides a method of a shorter branching command and a larger branching space. Thus, the memory is more efficiently used and multi-read cycles to obtain a branch target instruction are reduced or eliminated.

Figure 1:
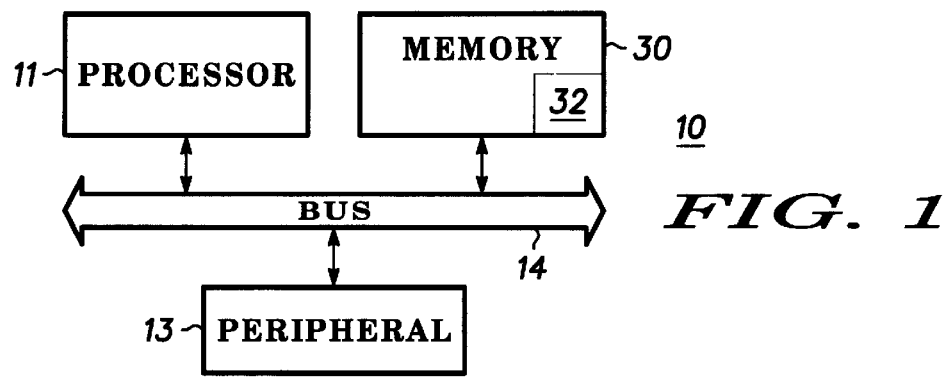
FIG. 1 is a simplified block diagram of a computer system employing the present invention.

FIG. 1 is a simplified block diagram of computer system 10 employing the present invention. Computer system 10 (hereafter 'computer') comprises processor or CPU 11, memory 30 and optional peripheral 13 coupled by bus 14. Peripheral 13 is not essential to the present invention but is illustrated because one or more peripherals are commonly used in connection with computers and it can be that a branching instruction is issued by a peripheral as well as by the CPU or that compression and decompression is performed by a peripheral as well as by the CPU.

Figure 2:
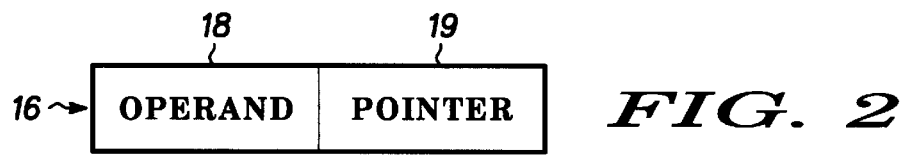
FIG. 2 is a simplified schematic diagram of the content of a branch instruction, according to a preferred embodiment of the invention; as employed in the system of FIG. 1.
Figure 3:
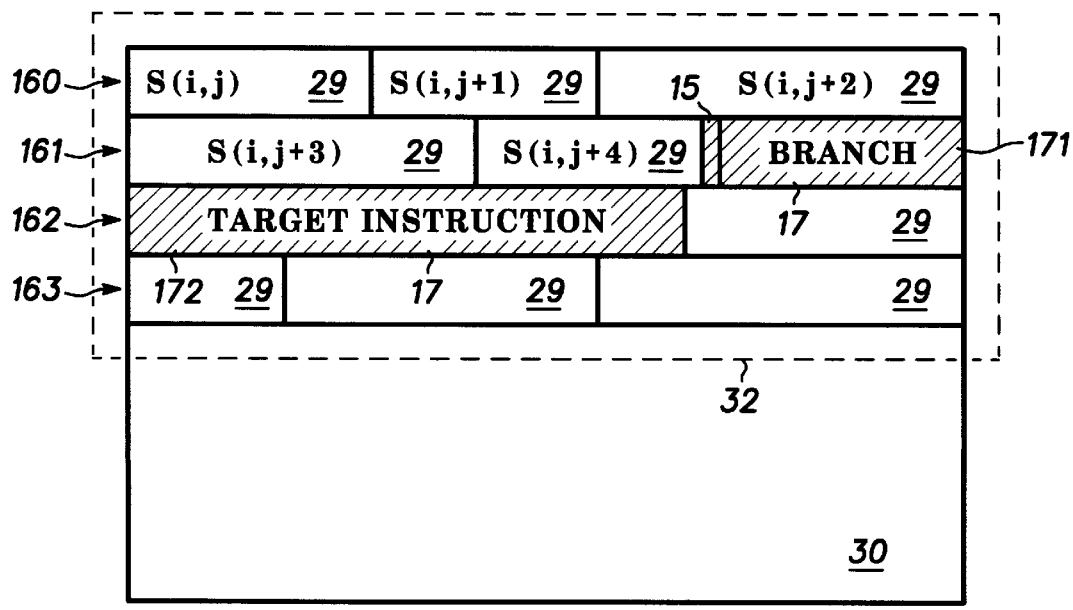
FIG. 3 is a simplified schematic diagram of a portion of a memory bank containing a single pointer branch instruction, according to a first embodiment of the invention.

Referring now to FIGS. 1–3, F instructions are conveniently stored in portion 32 of the memory 30. Portion 32 is also referred to as a memory bank. Portion 32 is conveniently arranged as a matrix of memory fields (e.g., rows and columns). Each row is comprised of a plurality of memory cells, and for convenience is referred to as memory word, e.g., row or word 160, 161, 162, 163, etc.

Each instruction has a length of $G(i)$ bits, where $i$ is an index identifying the instruction and $i=1,2,\ldots F$. Some of the F instructions are conveniently divided into H parts. It is an aspect of the present invention to arrange that certain instructions not be divided into parts prior to storage and retrieval and for those that are divided, how they are arranged in memory 30 in conjunction with instructions that are not divided into parts.

The size of each instruction and the size of each of the H parts of an instruction can vary. Variations can result from compressing each instruction. The compression is preferably done by using a Hoffman Code compression method. The H parts of an instruction are stored preferably in different locations in a memory bank, so there is a need to have K pointers to locate all H parts of a single instruction. As used herein, F, $G(i)$, i, H, K are integers.

FIG. 2 is a simplified schematic diagram of the content of branch instruction 16 being accessed (or written) by processor 11 to(from) memory 30, according to a preferred embodiment of the invention. Branch instruction 16 includes operand 18 and pointer 19. Operand 18 indicates that the CPU has to execute a branch instruction. Pointer 19 points to a branch target instruction, stored in portion 32 of memory 30.

FIG. 3 is a simplified schematic diagram of portion 32 of memory 30 containing a single pointer branch instruction, according to a first embodiment of the invention. Portion 32 contains branch target instruction 17, and a plurality of other instruction parts 29. Memory 30 can be much bigger than portion or memory bank 32. Branch target instruction 17 is pointed to by pointer 19 indicated in FIG. 2. A pointer is generally a memory location address where a particular instruction or portion of an instruction is to be found or stored.

F instructions are stored in memory 30. Conveniently, each instruction, except branch target instruction 17, is divided into H parts 29 where each part is denoted as S(i,j), with i being the instruction index having values i=1, . . . , F, and j being the index of the parts within the single instruction having values j=1, . . . ,H. S(i,j), i and j, are integers. H preferably equals four, but other values can also be used. For example, in FIG. 3, S(i,j) are shown for j=1 to 5. The number K of pointers needed to identify the H parts generally increases as H increases.

It is desirable to store instructions or parts of instructions in a compressed form, where compression is preferably done, for example, according to a Hoffman Algorithm. Instructions compressed using a Hoffman Algorithm generally have unequal size. Parts of the instruction compressed by a Hoffman Algorithm contain data concerning their length, so there is a need to point just to the beginning of each instruction part.

K pointers are needed to point to H parts of a single instruction, except for branch target instruction 17 which is pointed to by single pointer 19 (shown in FIG. 2). The K pointers are individually denoted as P(i,t) where i is the instruction index taking on values i=1, . . . ,F, and t is the pointer index taking on values t=1, . . . ,H. The variables K, P(i,t) and t are integers, with preferably K=2 when H=4, but other values can also be used.

Branch target instruction 17 is not divided, and is located ('pointed to') by single pointer 17 contained within branch instruction 16. Because branch instruction 16 contains just one pointer 19, this pointer can be quite long, allowing a large branching space. As shown in FIG. 3, if branch target instruction 17 is too long to fit into a single word at the location chosen, then it can lap over into the next word, as shown for example in FIG. 3 in words 161, 162 at locations 171, 172. Only one pointer address is needed since, 171, 172 are required to be contiguous, and when the end of a word (e.g., 161) is reached, the storage space automatically wraps to the beginning of the next word (e.g., 162).

Branch target instruction 17 is desirably stored with label 15, is wherein label 15 indicates that what is stored is a branch target instruction. Label 15 can be implemented by using one or more specially dedicated bits or by using a special combination of bits that are an integral part of branch target instruction 17 or as a prefix or suffix to branch target instruction 17. Label 15 is preferably located at or in the beginning of branch target instruction 17 or just before it. Branch target instruction 17 can be stored in decompressed form, while other instructions stored within memory bank 32 are preferably stored in a compressed form.

To summarize, instruction 16 uses single pointer 19 to locate branch target instruction 17 within memory bank 32. Branch target instruction 17 is not divided into H parts, while other instructions are divided into H parts and employ K pointers to locate the H parts 29 of the instruction within memory bank 32.

Figure 4:
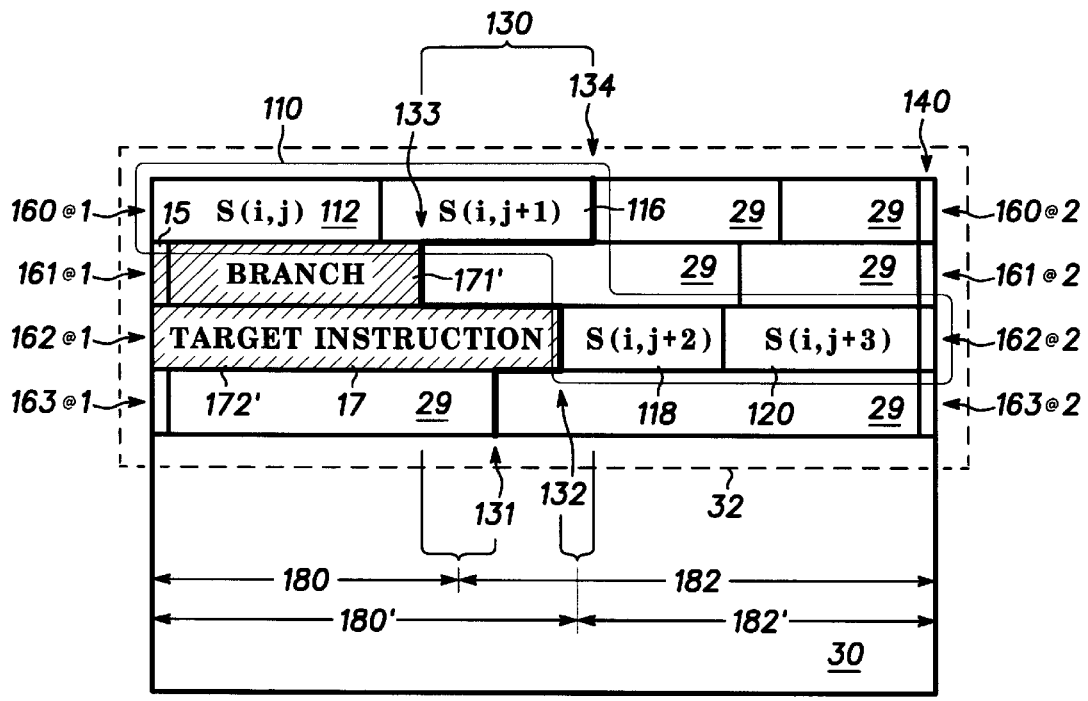
FIG. 4 is a simplified schematic diagram of a portion of a memory bank containing a single pointer branch instruction, according to a preferred embodiment of the invention.

FIG. 4 is a schematic diagram of portion 32 of a memory 30 according to a preferred embodiment of the invention. Portion 32 contains branch target instruction 17 and a plurality of other instruction parts 29. As noted previously, memory 30 can be much bigger than portion or memory bank 32.

F other instructions are stored in Memory bank 30 with each instruction divided into H parts. Each part is denoted as S(i,j), as previously explained. H preferably equals four, but other values can also be used. For example, in FIG. 4, memory portion 32 contains four parts S(i,j) 112, S(i,j+1) 116, S(i,j+2) 118, S(i,j+3) 120 of single instruction S(i) 110. Some or all of instructions parts S(i) can be stored in a compressed form, as previously explained.

K pointers are needed to point to the H parts of instruction 110. The K pointers are individually denoted as P(i,t), as previously explained. Preferably K=2 for H=4, but other values can also be used, depending on the value of H. Branch target instruction 17 requires only one pointer 19, but instruction 110 uses, for example, two pointers to identify the four parts of instruction 110.

Each memory word 160–163 is desirably divided into first part 160@1–163@1, followed by second part 160@2–163@2 and tag 140. Each first part 160 @1–163@1 can end in one of B possible locations (collectively 130), identified in FIG. 4 by the heavy vertical lines 131, 132, 133, 134 separating first parts 160@1–163@1 and second parts 160@2–163@2. Tag 140 indicates, for example, where first parts 106@1–163@1 end.

In the example of FIG. 4, considering the first four words 160–163, the parameter B=4, that is, there are 4 possible locations 131, 132, 133, 134 where each word 160, 161, 162, 163 can be separated into the first and second parts. In this situation, at least 2 bits are required for tag 140. But if each first part 160@1–163@1 can end in only one of two places. e.g., 131, 132, then tag 140 need only use one bit for indicating in which location 131, 132 first part 160@1–163 @1 ends. This is illustrated for words 162, 163 and in FIG. 6.

First parts 160@1–163@1 are located in first "half" 180, 180' of memory bank 32 and second parts 160@2–163@2 are located in second "half" of memory bank 32 where the words "half" and "halves" are intended to denote relative portions of each memory word 160–163 or memory bank 32 and do not imply that first half 180, 180' are equal in size to second half 182, 182'. The relative size of first half 180, 180' and second half 182, 182' can vary for each word 160–163, as indicated on FIGS. 4,6.

First V (V=trunc(H/2)) parts of each multi-part instruction are stored in first half 180, 180', e.g., in words 160@1–163@1. The first V parts of a first instruction are stored in consecutive order, followed by the first V parts of the second instruction, both in first half 180, 180'. The remaining H-V parts of the first instruction are stored in second half 182, 182', e.g., in words 160@2–164@2, followed by the H-V parts of the second instruction in second half 182, 182', and so forth. If, for example, instructions S(i) 110 is divided to four parts S(i,j) 112, S(i,j+1) 116, S(i,j+2) 118, S(i,j+3) 120, then first and second parts S(i,j) 112, S(i,j+1) 116 are stored in first half 180', e.g., in part 160@1 of memory word 160, and third and fourth parts S(i,j+2) 118, S(i,j+3) 120 are stored in second half 182', e.g., in part 162@2 of memory word 162. It is not necessary that related parts of the same instruction be stored in the first and second halves of the same word. As used herein, the "first instruction" can be any instruction in a sequence of instructions and the "second instruction" is a subsequent instruction.

Storing different parts of each instruction in a first and a second halves 180/180', 182/182' of memory bank 32, as described above, is advantageous in that it allows parallel decompressing of compressed instructions. That means that the instructions going to or from the first half of the memory bank and the instructions going to or from the second half of the memory bank can be compressed or decompressed in parallel. This shortens the compression/decompression time.

It is an aspect of the invention that branch target instruction 17 is not split and is stored in either the first half or the second half of memory bank 32 of memory, as for example, in words 161 @1–162@1. Where branch target instruction 17 is long enough that it will not fit within a first half of a memory word, then it can lap over into the next memory word of the same half, as for example, in locations 171', 172' in FIG. 4.

Figure 5:
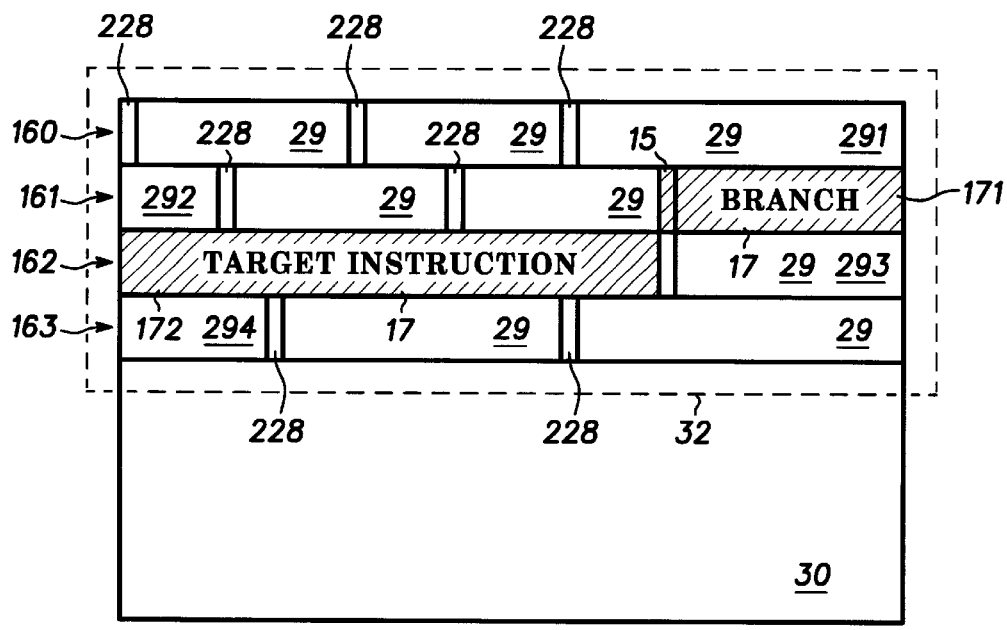
FIG. 5 is a simplified schematic diagram of a portion of a memory bank containing a single pointer branch instruction, according to yet a further embodiment of the invention.

FIG. 5 is a schematic diagram of portion 32 of a memory 30 containing single pointer branch instruction 17 in a manner analogous to that shown in FIG. 3 but according to yet a further embodiment of the invention. The embodiment shown in FIG. 5 differs from the embodiment shown in FIG. 3 by having labels 228 associated with the H instruction parts 29. Like reference numbers identify like elements and for simplicity the identification of S(i,j), j=0, 1, . . . H has been omitted from FIG. 5. Each instruction part 29 and branch target instruction 17 has a label 228 or 15, accordingly, indicating whether it is a branch target instruction or not, whereas in FIG. 3, it was assumed that any instruction portion not having label 15 is not a branch target instruction. Labels 228 and 15 are implemented by using one or more specially dedicated bits appearing in each instruction part 29 and in branch target instruction 17, as described above in connection with FIG. 3 for label 15.

Figure 6:
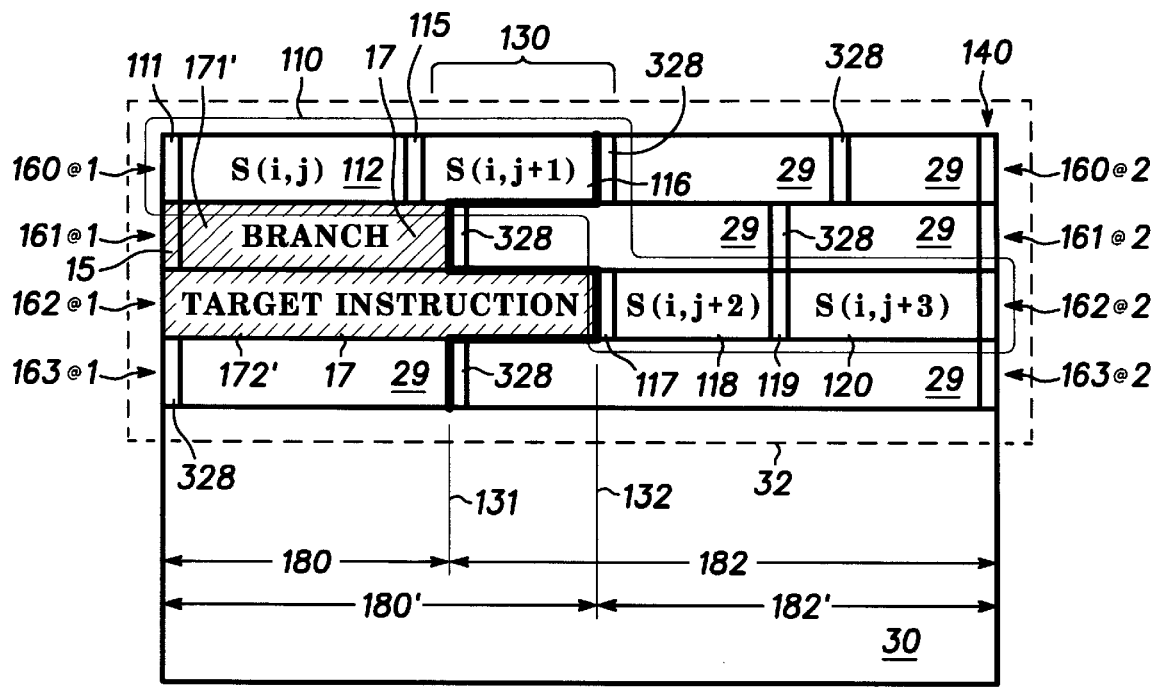
FIG. 6 is a simplified schematic diagram of a portion of a memory bank containing a single pointer branch instruction, according to a further preferred embodiment of the invention.

FIG. 6 is a schematic diagram of a portion 32 of a memory 30 containing single pointer branch instruction 17, analogous to that described in FIG. 4 but according to a still further embodiment of the invention. The embodiment shown in FIG. 6 differs from the embodiment shown in FIG. 4 by having labels 328, 111, 115, 117, 119. Like reference numbers identify like elements. Instruction parts 29, 112, 116, 118, 120 and branch target instruction 17 have label 328, 111, 115, 117, 119 and 15, respectively, indicating whether or not what follows is a branch target instruction. Labels 328, 111, 115, 117, 119, 15 are implemented by using one or more specially dedicated bits appearing in each instruction part, as has been previously described. In FIG. 6, the situation is illustrated where B=2 for all words 160–163, that is, the demarcations between first half 180, 180' and second half 182, 182' are limited to only two locations within words 160–163. Those of skill in the art will understand based on the description herein that memory bank 32 can contain many more words than those (160–163) illustrated in FIGS. is 3–6. In this situation, tag 140 can be only one bit, where a "1" indicates, for example, location 131 and "0" indicates location 132, or vice-versa. In this situation, the value of tag 140 for each word 160–163 indicates the first half length 180, 180' for each word 160–163. However, this is merely for convenience, and tag 140 can represent the beginning of second half 182, 182' or any other desired demarcation value.

Figure 7:
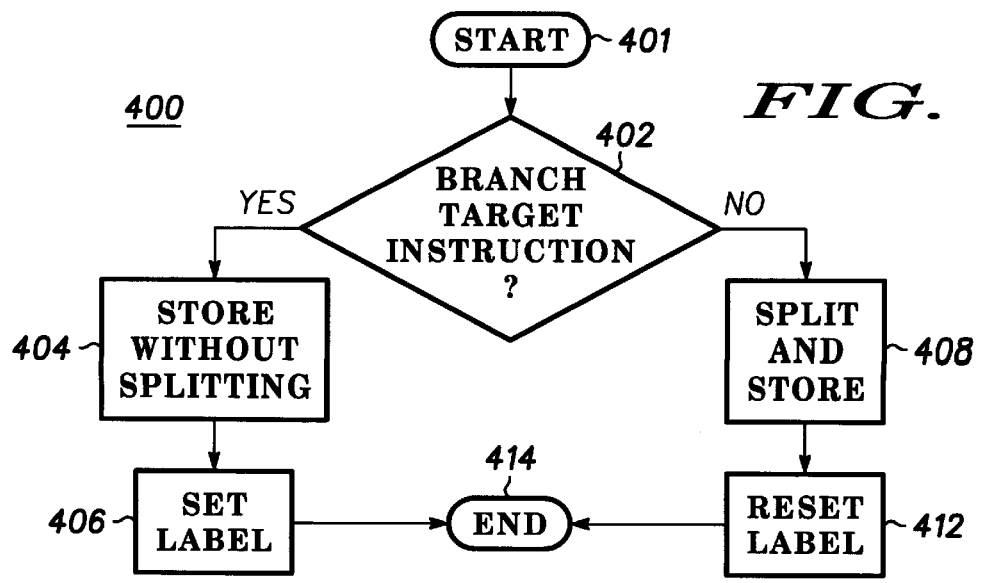
FIG. 7 is a simplified flow chart of a memory organization method, according to a preferred embodiment of the invention.

FIG. 7 is a simplified flow chart of computer operation method 400, according to a preferred embodiment of the invention. In combination with the FIGS. 2–6, FIGS. 7–8 illustrate how memory bank 32 is conveniently accessed and organized by processor 11. It is assumed for simplicity that an instruction is to be written to memory 30 by processor 11. Method 400 is initiated by start 401.

In query step 402, an instruction to be written to memory bank 32 of memory 30 is checked in order to determine if it is a branch target instruction or not. If the outcome of query step is 'YES', i.e., it is a branch target instruction, then it is not split and is conveniently stored in step 404 in first half 180,180' or second half part 180, 180' of memory bank 32, preferably in first half 180, 180'. In step 406, a label (e.g., label 15) is set indicating that the instruction is a branch target instruction. Step 406 can include setting tag 140 to identify the boundary between first half 180, 180' and second half 182, 182' where memory bank 32 is split.

If the outcome of query step 402 is 'NO', i.e., it is not a branch target instruction, then, in step 408 it is split into H parts which are stored in K different locations of memory bank 32. Each of the H parts, conveniently (but not essentially) has a label which is reset during step 412, indicating that the instruction part is not a part of branch target instruction. After either steps 406 or 412 the operation ends in step 414. Step 412 can include setting tag 140 to identify the boundary between first half 180, 180' and second half 182, 182' where memory bank 32 is split.

Figure 8:
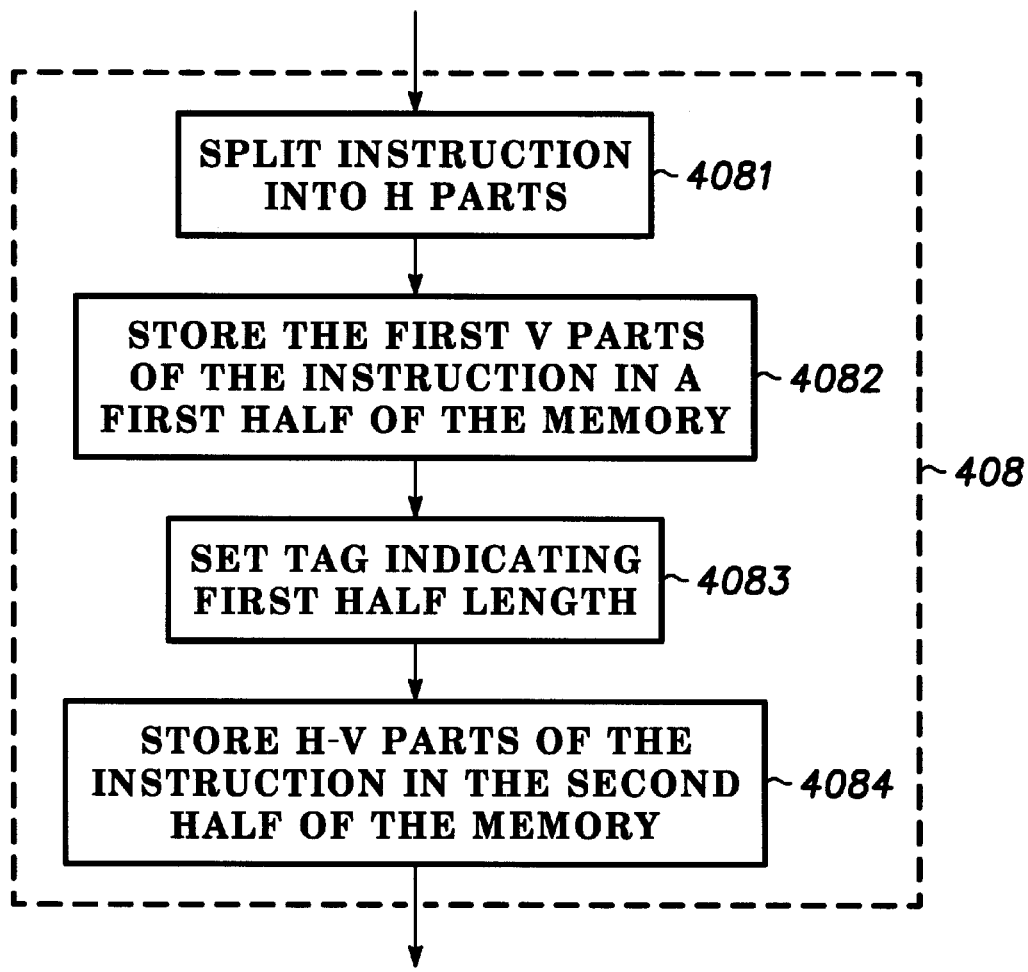
FIG. 8 is a flow chart showing further details of a portion of the flow chart of FIG. 7.

FIG. 8 shows further details of the method of FIG. 6 by illustrating how step 408 is performed in greater detail. In step 4081, the instruction is split into H parts where, preferably, H=4, but larger or smaller values can also be used. H=4 is convenient since K=2.

Each word of portion 32 of memory bank 30 is conveniently divided into two parts 180, 180' and 182, 182' (see FIG. 6). As has been previously noted, first and second halves 180, 180' and 182, 182' of the words in memory bank 30 are desirably of different size and can vary from word to word, where the parameter B indicates the number of different locations where the demarcation between first half 180, 180' and second half 182, 182' of words 160–163 can be placed. Each first half can end in one of B locations. Primes are used in connection with halves 180, 182 to indicate alternate locations of the boundary between the halves and unprimed numbers 180, 182 when used alone are intended to include primed numbers 180', 182'.

In step 4802, V out of H parts and H-V parts of the instruction are separately stored in memory bank 32, wherein V=trunc(H/2). The V out of H parts are, preferably, stored in first half 180 and the H-V parts stored in second half 182, but the locations can be interchanged. It is important that the V parts not be mixed between first and second halves 180, 182 of words of memory bank 32 but be placed in one or the other, and similarly for the H-V parts. That means that the V parts are in one half and the H-V parts are in the other half of memory bank 32, which ever half is chosen. For convenience of explanation, it is assumed in what follows that the V parts are stored in first half 180 and the H-V parts in second half 182.

In step 4082, the first V parts of a first instruction are stored in consecutive order in first half 180 of memory bank 32 and in step 4083 tag 140 is set to identify the boundary between the first V parts in first half 180. The first H-V parts are stored in second half 182 in step 4084. While it is convenient to perform step 4083 after 4082 and before step 4084, this is not essential and the steps can be performed in any other convenient order, depending on the needs of the system. When the H parts of the instruction have been stored, the process ends at 414.

The process repeats for the next instruction so that the first V parts of the next instruction are stored in first half 180 of the memory bank, and the first H-V parts of the next instruction stored in second half 182, etc., until all instruction parts are stored. For each word 160–163, tag 140 is desirably set to indicate, which of the B possible locations 130 forms the boundary between the first and second halves of each word. For example, in FIG. 6, B=2 at locations 131, 132.

The instructions parts and instructions wrap from one word to the next. This is illustrated in FIG. 5 where it is seen that branch tarter instruction 17 has portion 171 in word 161 and portion 172 in word 162. Also, portions 291, 292 of the same instruction part wrap from word 160 to 161 and portions 293, 194 of the same instruction part wrap from word 162 to 163. Where memory bank 32 is divided into "halves", the instructions parts and instructions wrap from one word to the next within the same half. This is illustrated in FIG. 6 where branch target instruction 17 has portion 171 in word 161@1 and portion 172 in word 162@1.

The splitting of instructions into H parts applies to instructions that are not branch target instructions. Branch target instructions are not divided into parts and are identified by a single pointer, as has been previously explained. Using a single pointer to point to the undivided branch target instruction, allows a relatively big branching space, and the branch instruction can be read and processed in a few, or even a single, clock cycle. Dividing the remaining instructions into H parts and storing them respectively in first or second "halves" of memory bank 32 in the manner described, allows parallel coding and decoding of the non-branch target instructions, thereby speeding processing of the instructions.

While the present invention has been described in terms of dividing the memory bank into two "halves", a larger number of partitions can also be used and the words "half" and "halves" are intended to include more than 2 partitions. Further, while it is convenient to use H=4 and K=2 and B=2, other choices can be made for these parameters without departing from the invention in its most general sense. It will be understood by those skilled in the art that various changes in form and detail may be made without departing from the spirit and scope of the invention which is embodied in the claims that follow.

What is claimed is:

1. A computer system comprising a memory portion that stores a branch target instruction and other instructions, wherein the other instructions are divided into H parts and wherein the branch target instruction is stored in the memory portion identified by a single pointer, and wherein K pointers are used to point to the H parts and wherein the branch target instruction is stored with a label indicating that it is a branch target instruction.

2. The computer system of claim 1, wherein further labels are stored with the other instructions so that labels identify whether an instruction part is a branch target instruction or other instruction part.

3. The computer system of claim 1, wherein some instruction parts are compressed so that a compressed instruction part contain information on the length of the compressed instruction part.

4. The computer system of claim 1, wherein the memory portion is made up of memory words and each memory word includes a first half a second half and a tag, wherein each first half can end in one of possible B locations and each tag indicates where each first part ends.

5. The computer system of claim 4 wherein a first V (V=trunc(H/2)) parts of each instruction are stored in first halves of memory words and H-V parts are stored in second halves of memory words.

6. The computer system of claim 5 w herein the first V parts of a first instruction are stored in consecutive order in first halves of successive memory words, followed by all first V parts of a next instruction.

7. A method of operating a computer system having memory, comprising the steps of:
   checking whether an instruction to be executed by the computer system is a branch target instruction or not;
   if YES, storing the branch target instruction with a single pointer; and
   if NO, splitting the instruction into H parts, and storing the H parts in K different locations in the memory.

8. The method of claim 7, wherein the steps of splitting and storing into H parts further comprise splitting a first instruction into V parts wherein V=trunc(H/2) and H-V parts, and storing the V parts in a first half of the memory and storing the H-V parts in a second half of the memory.

9. The method of claim 8 wherein the V parts occupy the first halves of one or more words and the H-V parts occupy the second halves of one or more words.

10. The method of claim 8 further comprising repeating the checking step and, if NO, storing the V parts of a second instruction in the same half as the V parts of the first instruction.

* * * * *

UNITED STATES PATENT AND TRADEMARK OFFICE
CERTIFICATE OF CORRECTION

PATENT NO. : 6,202,144 B1
DATED : March 13, 2001
INVENTOR(S) : Arie Ben-Ephraim et al.

It is certified that error appears in the above-identified patent and that said Letters Patent is hereby corrected as shown below:

Claim 3, column 8,
Line 5, change "contain" to -- contains --

Claim 6, column 8,
Line 15, change "w herein" to -- wherein --

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*